United States Patent [19]

Watts

[11] Patent Number: 5,397,385
[45] Date of Patent: Mar. 14, 1995

[54] ANTI-FOULING COATING COMPOSITION CONTAINING CAPSAICIN

[76] Inventor: James L. Watts, 1515 19th St., Galveston, Tex. 77550

[21] Appl. No.: 218,612

[22] Filed: Mar. 28, 1994

[51] Int. Cl.$^6$ .................................. C09D 5/14
[52] U.S. Cl. ........................ 106/18.32; 106/15.05; 424/78.09; 424/195.1; 427/385.5; 427/386; 428/457; 428/537.1; 428/688; 514/655; 523/122
[58] Field of Search .................. 106/15.05, 18.32; 424/78.09, 195.1; 514/655; 252/384; 427/385.5, 386; 428/688, 537.1, 457; 523/122; 426/655

[56] References Cited

U.S. PATENT DOCUMENTS

| | | | |
|---|---|---|---|
| 3,912,519 | 10/1975 | Takagi et al. | 106/15.05 |
| 3,997,461 | 12/1976 | Davie | 106/15.05 |
| 4,021,392 | 5/1977 | Milne et al. | 427/409 |
| 4,127,687 | 11/1978 | Dupont | 428/452 |
| 4,455,304 | 6/1984 | Yaralian | 424/195.1 |
| 4,789,567 | 12/1988 | Freeman et al. | 427/410 |
| 4,968,538 | 11/1990 | Freeman et al. | 427/410 |
| 5,226,380 | 7/1993 | Fischer | 114/222 |

FOREIGN PATENT DOCUMENTS 55-105601  8/1980  Japan ................. 106/15.05

Primary Examiner—Anthony Green
Attorney, Agent, or Firm—Kenneth A. Roddy

[57] ABSTRACT

An anti-fouling coating utilizes capsaicin as an anti-fouling agent. In a preferred embodiment, finely divided capsaicin, an oleoresin capsaicin liquid solution, or crystalized capsaicin, is mixed with a suitable corrosion resistant epoxy resin which is then mixed with a hardening catalyst and applied to the surface to be treated. In some applications, finely divided inert particles may be added to impart additional desirable characteristic to the surface. The capsaicin constituent used in the coating preferably has a rating of from about 100,000 to about 1,500,000 Scoville Heat Units. The capsaicin may be mixed with a silicon dioxide and then solubilized into a free-flowing homogeneous liquid oleoresin composition by adding a solvent to increase solubility and facilitate mixing. The capsaicin may also be formed into crystals which are mixed with the coating material. The anti-fouling composition can be used in combination with conventional anti-fouling coatings and paints and binders and applied to wood, metal, and plastic surfaces. The anti-fouling composition may also be added to other materials in molding processes to form various articles of manufacture and molded products, such as boat hulls and water pipes, which resist fouling by organisms common in fresh water and sea water.

36 Claims, No Drawings

ANTI-FOULING COATING COMPOSITION CONTAINING CAPSAICIN

BACKGROUND OF THE INVENTION

1. Field of the Invention

This invention relates generally to anti-fouling coatings, and more particularly to an anti-fouling coating containing capsaicin as an active ingredient.

2. Brief Description of the Prior Art

Various antifungal, algeacides, and antifouling agents have been used in coatings and paints for different environments to prevent mildew, fungus, and sea water flora and fauna.

The mildew or fungus which grows on house paints and the like, utilizes the paint medium, or in some cases, the underlying substrate, such as wood, as the nutrient. The micelia and fruiting bodies of the fungi contact or penetrate the paint film and thus, through intimate contact with any fungicides in the film (to a large extent regardless of whether the fungicides are highly soluble, slightly soluble, or insoluble in water), the fungi are destroyed.

In cooling towers and piping systems utilizing fresh water, slime and algea may develop if effective compounds for combating their growth are not present. In the area of anti-fouling paints, a relatively narrow group of compounds is useful for preventing the fouling of marine structures, such as boat or ship hulls, pilings, oil well drilling towers, and the like, by organisms common in sea water and brackish water. Such organisms include; algea, slime, hydroids, mollusks, barnacles, and the like.

A critical factor, particularly in fresh water and sea water marine applications is that the active ingredient in the coating or paint cannot be highly soluble or it will leach out of the anti-fouling coating or paint in a short period of time and drastically reduce its effectiveness. On the other hand, many anti-fouling coatings and paints provide an active ingredient which is allowed to leach over a period of time or which forms a film on the exterior of the coated or painted surface to combat the fouling organisms.

Conventional anti-fouling agents used in marine anti-fouling coatings and paints include inorganic heavy-metal compounds such as mercury and copper, and various types of organic and organo-metallic compounds. However, the inorganic metal compounds loose their effectiveness rapidly in sea water contaminated with hydrogen sulfide. Some of the organic anti-fouling agents are effective for preventing the attachment of only particular marine lives, but are not effective against others. Among the inorganic and organic compounds, there are many which may be effective for preventing the attachment of marine lives, but are not suited for practical use because of their toxicity to the human body or other marine life, or will pollute the environment.

Takagi et al, U.S. Pat. No. 3,912,519 discloses an anti-fouling ship bottom paint containing an active ingredient comprising 5-chloro-4-phenyl-1,2-dithiol-3-one or a mixture of that compound and 3,5-di-lower alkyl-4-hydroxy-benzylidene. These compounds have such a high rate of decomposition that they have no residual toxicity and cause no environmental pollution.

Davie, U.S. Pat. No. 3,997,461 discloses an anti-foulant coating composition composed of two components (A) and (B) which are mixed immediately before the composition is applied. The active ingredient of Component A is a base of coal-tar pitch or equivalent and epoxy resin. The active ingredients of component B are a curing agent for the epoxy resin and a solid organo tin toxicant, mainly a solid trialkylin carboxylate. The toxicant may either be a slurry of needle-like crystals or the toxicant may be dissolved in a solvent. The toxic activity is due to the tin content of the organatin toxicant.

Milne et al, U.S. Pat. No. 4,021,392 discloses an anti-fouling marine paint composition which releases organo tin ions into sea water. The composition comprises; a film-forming copolymer of at least one triorgano tin salt of an olefinically unsaturated carboxylic acid and the balance of the copolymer being units of at least one olefinically unsaturated comonomer, a substantially water insoluble metalliferous pigment capable of reacting with sea water to form the mater soluble metal compound, and a hydrophobic organic retarder for retarding the rate of ion exchange between sea water and the copolymer.

Dupont, U.S. Pat. No. 4,127,687 discloses an anti-fouling marine paint containing an organic binder and an effective amount of certain 3-isothaizolones.

Freeman et al, U.S. Pat. Nos. 4,789,567 and 4,968,538 disclose an abrasion resistant coating and method of application wherein a protective coating of resin containing finely divided abrasion resistant particles is diluted with a solvent and applied to a surface. The applied coating is cured to achieve either a single layer of inert material dispersed in the resin, or two layers including a dense layer of inert material in resin covered by a thin layer of resin, and to provide a glossy or matte appearance as desired.

"Capsaicin" is an incredibly powerful and stable alkaloid seemingly unaffected by heat or cold, which retains its original potency over time, cooking, or freezing. Capsaicin is the bitter compound and naturally occurring heat source for chile peppers of the genus Capsicum, as *C. frutescens,* and is concentrated mostly in the placental tissue of the pepper. For every hundred parts of capsaicin in the placental tissue, there are six parts in the rest of the fruit tissue, and four parts in the seeds. Two very pungent synthetic capsainoid compounds are capsaicin (C) and dihydrocapsaicin (DHC).

The technique for determining capsaicin pungency is by high-pressure liquid chromatography (HPLC). The standard industry measurement for capsaicin levels is given in Scoville Heat Units. Pure capsaicin equals 16 million Scoville Units. The following chart illustrates the range of Scoville Heat Units present in various chile pepper varieties utilizing HPLC.

| Chile Pepper Variety | Approx. Scoville Units |
| --- | --- |
| Habenaro, Bahamian | 100,000–300,000 |
| Santaka, Chiltepin, Thai | 50,000–100,000 |
| Aji, Rocoto, Piquin, Cayenne, Tabasco | 30,000–50,000 |
| de Arbol | 15,000–30,000 |
| Yellow Wax Hot, Serrano | 5,000–15,000 |
| Jalapeno, Mirasol | 2,500–5,000 |
| Sandia, Cascabel | 1,500–2,500 |
| Ancho, Pasilla, Espanola | 1,000–1,500 |
| NuMex Big Jim, NM 6-4 | 500–1,000 |
| R-Naky, Mexi-Bell, Cherry | 100–500 |
| Mild Bells, Pimiento, Sweet Banana | 0 |

Various kinds of pepper derivatives have been known to be used to repel pests.

Yaralian, U.S. Pat. No. 4,455,304 discloses a composition for repelling birds wherein the active ingredients are finely divided dried cayenne pepper (30,000-50,000 Scoville Units), finely divided dried garlic diluted by inert, finely divided mineral material (dry application) or water (liquid application) for application to the earth surface or to growing plants. The garlic constituent is present in at least about one-fifth to about five times the pepper constituent.

Oleoresin Capsicum is an extract of natural spice and is commonly used in foods and medicinal applications whenever a warming or pungent sensation is desired.

Kalsec, Inc. of Kalamazoo, Mich. produces a commercially available oleoresin capsicum product which is commonly used as a food flavoring under the product name of "Oleoresin Capsicum, African type, 6% MC". This product is made from the dried fruit of *Capsicum frutescens* mixed with vegetable oils and contains 5.40% to 6.60% capsainoids.

Fischer, U.S. Pat. No. 5,226,380 discloses a marine coating containing cayenne pepper and method of applying the coating. Fischer teaches applying a layer of waterproof adhesive or paint to the surface to be protected, and then applying a deposit of cayenne pepper (30,000-50,000 Scoville Units), to the adhesive layer while it is in the uncured state. A layer of copper granules may also be applied to the adhesive layer after the cayenne pepper in sufficient density to cover the entire surface while leaving sufficient spacing between the copper granules to form a permeable layer through which the repellent properties of the pepper can diffuse and in cooperation with the copper granules provide additional protection for the surface. Alternatively, a copper wire screen, an unwoven mat of copper wires, or short chopped lengths of copper wire, may be used instead of the granules to provide a permeable layer of copper. Fischer also teaches that at least part of the anti-fouling materials may be mixed with the adhesive and applied simultaneously. As the paint leaches away, the anti-foulant is exposed to "release heat" to repel marine organisms in the vicinity of the surface.

In the Fischer process the anti-foulant properties of the pepper particles would be short lived whether it is applied as an outer layer or mixed with the paint prior to application, due to leaching either into the paint mixture or into the water surrounding the coating. Fischer also utilizes particles or an oleoresin capsicum derived from the cayenne pepper which would have a pungency rating of only 30,000-50,000 Scoville Units. It has also been found that merely mixing an oleoresin with an adhesive, ablative paint, or epoxy or polyurethane compounds, will often adversely affect the curing time and physical properties of the coating material.

The present invention is a significant improvement in that it utilizes an oleoresin capsicum, capaiscin particles, or capsaicin crystals which are derived from the Habenaro pepper which has a pungency rating of 100,000-300,000 Scoville Units in the natural state and which, as utilized in the preferred embodiment, is highly concentrated to produce a pungency rating of from 1,000,000-1,500,000 Scoville Units. To overcome the incompatibility problem with mixing oleoresin with marine coatings, the present process mixes the capsaicin (alkaloid) with a selected solvent and with silicon dioxide to form an improved additive which is more compatible with the coating material and with coloring agents, pigments, and dyes.

Compatibility of the present additive with the coating mixture is also improved by adding a binding agent to the coating material, prior to adding the previously described additive. The present invention also discloses a process for producing capsaicin crystals which prevents, to a large degree, the "bleedout" of the anti-foulant capsaicin into the coating mixture and permits greater loading of the coating with the capsaicin than the process using a liquid oleoresin capsaicin mixture. Mixing the crystalized capsaicin with various coating materials, such as marine paints, or epoxy or polyurethane compounds, reduces the adverse effects on the curing time and physical properties of the coating material which might otherwise occur when using a liquid oleoresin capsaicin.

A much longer lasting and durable anti-fouling coating is obtained by combining the present additive with finely divided abrasion resistant particles (ceramic). The improved compatibility of the present additive with other materials also makes it suitable for use in molding products and creating articles of manufacture having a surface with the capsaicin contained therein.

The present invention is distinguished over the prior art in general, and these patents in particular by an anti-fouling coating which utilizes capsaicin as an anti-fouling agent. In a preferred embodiment, finely divided capsaicin, an oleoresin capsaicin liquid solution, or crystalized capsaicin is mixed with a suitable corrosion resistant epoxy resin which is then mixed with a hardening catalyst and applied to the surface to be treated. In some applications, finely divided inert particles may be added to impart additional desirable characteristic to the surface. The capsaicin constituent used in the coating preferably has a rating of from about 100,000 to about 1,500,000 Scoville Heat Units. The capsaicin may be mixed with a silicon dioxide and then solubilized into a free-flowing homogeneous liquid oleoresin composition by adding a solvent to increase solubility and facilitate mixing. The capsaicin may also be formed into crystals which are mixed with the coating material. The anti-fouling composition can be used in combination with conventional anti-fouling coatings and paints and binders and applied to wood, metal, and plastic surfaces. The anti-fouling composition may also be added to other materials in molding processes to form various articles of manufacture and molded products, such as boat hulls and water pipes, which resist fouling by organisms common in fresh water and sea water.

SUMMARY OF THE INVENTION

It is therefore an object of the present invention to provide an anti-fouling coating composition which is effective in combating the growth of mildew, fungi, and marine organisms such as algea, slime, hydroids, mollusks, barnacles, and the like.

It is another object of this invention to provide an anti-fouling composition which can be used in combination with other conventional anti-fouling coatings and paints and binders and applied to wood, metal, and plastic surfaces.

Another object of this invention is to provide an anti-fouling composition which can be added to other materials during the molding process for forming various articles of manufacture and molded products, such as boat hulls and water pipes.

Another object of this invention is to provide an anti-fouling coating composition having capsaicin as an active ingredient.

Another object of this invention is to provide an anti-fouling coating which utilizes crystalized capsaicin mixed with the coating material.

A further object of this invention is to provide an anti-fouling coating composition having capsaicin as an active ingredient wherein the pungency of the capsaicin constituent is in the range of from about 100,000 to about 1,500,000 Scoville Units.

A still further object of this invention is to provide an anti-fouling coating composition which is simple and economical to manufacture, durable, and effective over long periods of time.

Other objects of the invention will become apparent from time to time throughout the specification and claims as hereinafter related.

The above noted objects and other objects of the invention are accomplished by an anti-fouling coating which utilizes capsaicin as an anti-fouling agent. In a preferred embodiment, finely divided capsaicin, an oleoresin capsaicin liquid solution, or crystalized capsaicin is mixed with a suitable corrosion resistant epoxy resin which is then mixed with a hardening catalyst and applied to the surface to be treated. In some applications, finely divided inert particles may be added to impart additional desirable characteristic to the surface. The capsaicin constituent used in the coating preferably has a rating of from about 100,000 to about 1,500,000 Scoville Heat Units. The capsaicin may be mixed with a silicon dioxide and then solubilized into a free-flowing homogeneous liquid oleoresin composition by adding a solvent to increase solubility and facilitate mixing. The capsaicin may also be formed into crystals which are mixed with the coating material. The anti-fouling composition can be used in combination with conventional anti-fouling coatings and paints and binders and applied to wood, metal, and plastic surfaces. The anti-fouling composition may also be added to other materials in molding processes to form various molded products, such as boat hulls and water pipes, which resist fouling by organisms common in fresh water and sea water.

DESCRIPTION OF THE PREFERRED EMBODIMENT

The present anti-fouling coating, in a preferred embodiment, utilizes capsaicin as an anti-fouling agent carried in a corrosion resistant resin which is then mixed with a hardening catalyst and applied to the surface to be treated. Other finely divided inert particles may be added to impart additional desirable characteristic to the surface. For example, ceramic particles may be added to increase abrasion resistance.

The capsaicin compound utilized as the anti-fouling agent in the coating is obtained from chile peppers of the genus *C. frutescens*, and more particularly, the capsaicin which is obtained from the placental tissue of the Habenaro chile pepper or Bahamian chile pepper which have a pungency rating of from about 100,000 to about 300,000 Scoville Heat Units in their natural state. The present invention, utilizes highly concentrated capsaicin which has a pungency rating in the range of from about 100,000 to about 1,500,000 Scoville Heat Units, with a range of from about 1,000,000 to about 1,500,000 being preferred. It should be noted that the capsaicin utilized in the present invention is derived from a specific variety of chile pepper and has a much higher Scoville rating than obtained from cayenne peppers and other varieties of chile peppers with substantially lower Scoville Heat Unit ratings.

The capsaicin may be provided in the form of a particulate or powder made from finely divided particles of the dried Habanero pepper or may be provided as an oleoresin extract derived from commercially available oleoresin Capsicum, such as an oleoresin product manufactured by Kalsec, Inc. of Kalamazoo, Mich. under the product name of "Oleoresin Capsicum, African type, 6% MC". The later product is made from the dried fruit of *Capsicum frutescens* mixed with vegetable oils and contains 5.40% to 6.60% capsainoids. The capsaicin described herein may also be derived from highly pungent synthetic capsainoid compounds, such as capsaicin (C) and dihydrocapsaicin (DHC). As described hereinafter, the capsaicin may also be provided in the form of capsaicin crystals.

In order to increase solubility and facilitate mixing of the capsaicin with other ingredients and to reduce the tendency of the oleoresin capsaicin extract to separate into two phases, the particulate capsaicin or oleoresin capsaicin extract is mixed with a suitable silicon dioxide, and then is solubilized into a free-flowing homogeneous liquid oleoresin composition by adding a suitable solvent such as benzyl alcohol, methyl-ethyl-ketone (MEK), or isopropyl alcohol.

A liquid additive suitable for mixing with other substances to repel marine organisms utilizes a mixture of from about 20% to about 90% by weight capsaicin and from about 10% to about 80% by weight of the selected solvent, and may include an effective amount of silicon dioxide to facilitate mixing and prevent phase separation.

The chemical name and family for silicon dioxide is: synthetic amorphous silica, the synonyms are: amorphous silicon dioxide, silica gel, silicic acid; and its chemical notation or structure is: $SiO_2 \times H_2O$. A suitable silicon dioxide is manufactured under the trade name "Syloid" and "Syloid Silicas" by W. R. Grace & Co., Baltimore, Md.

The relative proportions are in the range of from about 20% to about 75% by weight capsaicin and from about 15% to about 50% by weight of solvent and from about 10% to about 50% by weight of silicon dioxide. The capsaicin, solvent, and silicon dioxide are mixed by conventional methods known in the art, such as hand mixing or mechanical stirrer. The free-flowing oleoresin capsaicin liquid solution is then ready to be mixed with the coating or paint compounds.

The anti-fouling oleoresin capsaicin liquid solution can be used in combination with conventional anti-fouling coatings and paints and binders and applied to wood, metal, and plastic surfaces. A suitable anti-fouling marine coating composition would utilize a mixture of from about 25% to about 90% by weight of the selected coating material and from about 10% to about 75% by weight of the capsaicin constituent. Examples of trade recognized binders to which the solution may be added are; polyvinyl chloride in a solvent based system, chlorinated rubber in a solvent based system, acrylic resins in solvent based or aqueous systems, vinyl chloride-vinyl acetate copolymer systems as aqueous dispersions or solvent based systems, butadiene-styrene-acrylonitrile rubbers, drying oils such as linseed oil, asphalt, epoxies, and the like. The oleoresin capsaicin liquid solution may also be mixed with inorganic pigments, organic pigments or dyes insoluble in sea water, and, in some applications, may contain materials such as rosin to provide controlled release of the active ingredients. It may also contain plasticizers, rheology characteristic modifiers and other ingredients.

The oleoresin capsaicin liquid solution may also be added to other materials such as polyvinylchloride, epoxies, resins, etc., in molding processes for forming various articles of manufacture and molded products, such as boat hulls and water pipes, to prevent fouling by organisms common in fresh water and sea water.

For example, the anti-fouling capsaicin compound may be mixed with conventional materials which are used in the molding process in the ratio by weight of from about 10% to about 75% of the capsaicin compound to from about 25% to about 90% of the molding material. During the molding operation, the capsaicin becomes integrally formed into the surface of the article. The article thus formed or produced by the molding process would contain the capaiscin in at least one surface of the article in sufficient quantity to discourage the penetration and attachment of marine organisms to the surface.

Various other antifungal, algeacides, pesticides and anti-fouling agents may also be added to the oleoresin capsaicin solution to prevent mildew, fungus, and sea water flora and fauna and various other types of pests depending upon the particular application and environment. For example, tests have been conducted using tannic acid, oil of Cassia, and eucalyptus oil additives with the oleoresin capsaicin solution.

In a preferred embodiment, the anti-fouling coating is prepared by mixing the oleoresin capsaicin liquid solution with a suitable corrosion resistant resin, such as an epoxy, polyester, polyglycol, Novoloc, or vinyl ester resin, and introducing a hardening catalyst. Usually, when the epoxy and catalyst are mixed according to the manufacturer's recommendations, a highly viscous liquid is obtained. To reduce the viscosity and allow a more economic coating thickness, a thinning solvent may be added to the resin, such as methyl-ethyl-ketone (MEK), isopropyl alcohol, or benzyl alcohol. Silicon dioxide, Novolac resins, and polyglycol resins may also be added to the epoxy resin to enhance the surface texture qualities of the final product.

A suitable resin composition utilizes a mixture of from about 60% to about 80% resin and from about 4% to about 8% of a hardening catalyst, the mixture being mixed in a proportion of from about 20% to about 60% by weight of the resin mixture to the capsaicin composition. Fine particles of abrasion resistant material, such as ceramic particles may also be added to the mixture.

In the following examples, a commercially available abrasion resistant epoxy resin was used which is manufactured by Owens-Corning and marketed under the name Owens-Corning Abrasion Resistant Coating, because of its excellent durability. This particular resin coating contains 90% by weight finely divided ceramic particles dispersed in 10% by weight Bisphenol A epoxy resin and an elastomer additive to enhance flexibility to the coating as applied. The hardening catalyst used was the catalyst recommended by the manufacturer for use with the abrasion resistant epoxy resin. The epoxy resin material was modified by adding a thinning solvent to the resin to reduce the viscosity and allow a more economic coating thickness, as taught in U.S. Pat. Nos. 4,789,567 and 4,968,538 issued to John E. Freeman et al, the disclosures of which are hereby incorporated by reference.

EXAMPLE 1

In one example, an anti-fouling coating was prepared by mixing the oleoresin capsaicin liquid solution with the Owens-Corning Abrasion Resistant Coating, described above, which coating contains 90% by weight finely divided ceramic particles dispersed in 10% by weight Bisphenol A epoxy resin and an elastomer additive to enhance flexibility to the coating as applied. The hardening catalyst was also a commercially available catalyst appropriate for the particular resin.

An oleoresin capsaicin liquid solution was prepared by mixing 25% by weight capsaicin and 25% by weight of silicon dioxide and 50% by weight of solvent (MEK). The resulting oleoresin capsaicin solution was then mixed with the epoxy resin and the hardening catalyst in the following relative proportions; 73% by weight of epoxy resin, 22% by weight of the oleoresin capsaicin solution, and 5% by weight of catalyst. The capsaicin-resin-catalyst mixture was then applied to a sand blasted steel surface in two passes and cured in an oven at 170° F. After curing, the resultant coating was 6 to 6.5 mils thick and had excellent curing and flexibility characteristics and a semi-gloss finish.

EXAMPLE 2

In a second example, an anti-fouling coating was prepared by mixing the oleoresin capsaicin liquid solution with the Owens-Corning Abrasion Resistant Coating, described above, which coating contains 90% by weight finely divided ceramic particles dispersed in 10% by weight Bisphenol A epoxy resin and an elastomer additive to enhance flexibility to the coating as applied. The hardening catalyst was also a commercially available catalyst appropriate for the particular resin.

An oleoresin capsaicin liquid solution was prepared by mixing 40% by weight capsaicin and 20% by weight of silicon dioxide and 40% by weight of solvent (MEK). The resulting oleoresin capsaicin solution was then mixed with the epoxy resin and the hardening catalyst in the following relative proportions; 73% by weight of epoxy resin, 22% by weight of the oleoresin capsaicin solution, and 5% by weight of catalyst. The capsaicin-resin-catalyst mixture was then applied to a sand blasted steel surface in two passes and cured in an oven at 170° F. After curing, the resultant coating was 8 mils thick and had excellent curing and flexibility characteristics and a semi-gloss finish. The color changed from white to light orange.

EXAMPLE 3

In a third example, an anti-fouling coating was prepared by mixing the oleoresin capsaicin liquid solution with the Owens-Corning Abrasion Resistant Coating, described above, which coating contains 90% by weight finely divided ceramic particles dispersed in 10% by weight Bisphenol A epoxy resin and an elastomer additive to enhance flexibility to the coating as applied. The hardening catalyst was also a commercially available catalyst appropriate for the particular resin.

An oleoresin capsaicin liquid solution was prepared by mixing 57% by weight capsaicin and 14% by weight of silicon dioxide and 29% by weight of solvent (MEK). The resulting oleoresin capsaicin solution was then mixed with the epoxy resin and the hardening catalyst in the following relative proportions; 72% by weight of epoxy resin, 22% by weight of the oleoresin capsaicin solution, and 6% by weight of catalyst. The capsaicin-resin-catalyst mixture was then applied to a sand blasted steel surface in two passes and cured in an oven at 170° F. After curing, the resultant coating was 11 mils thick and had excellent curing and flexibility characteristics and a semi-gloss finish. The color changed from white to medium orange.

EXAMPLE 4

In a fourth example, an anti-fouling coating was prepared by mixing the oleoresin capsaicin liquid solution with the Owens-Corning Abrasion Resistant Coating, described above, which coating contains 90% by weight finely divided ceramic particles dispersed in 10% by weight Bisphenol A epoxy resin and an elastomer additive to enhance flexibility to the coating as applied. The hardening catalyst was also a commercially available catalyst appropriate for the particular resin.

An oleoresin capsaicin liquid solution was prepared by mixing 73% by weight capsaicin and 9% by weight of silicon dioxide and 18% by weight of solvent (MEK). The resulting oleoresin capsaicin solution was then mixed with the epoxy resin and the hardening catalyst in the following relative proportions; 73% by weight of epoxy resin, 22% by weight of the oleoresin capsaicin solution, and 5% by weight of catalyst. The capsaicin-resin-catalyst mixture was then applied to a sand blasted steel surface in two passes and cured in an oven at 170° F. After curing, the resultant coating was 11 mils thick and had good curing characteristics. The coating was somewhat brittle and had a semi-gloss finish. The color changed from white to deep orange.

Similar tests were conducted with other additives added to the resin along with the oleoresin capsaicin. In one case, tannic acid, oil of Cassia, and eucalyptus oil were mixed with the oleoresin capsaicin solution, and the solution was mixed with the above described epoxy resin. The mixture was then applied to a sand blasted steel surface in two passes and cured in an oven at 170° F. It was found that the oils in the additives rendered the coating more difficult to cure and caused blisters in the surface. The resultant coating was 12–14 mils thick and was brittle.

Although the above described examples utilize the capsaicin oleoresin solution mixed with an abrasion resistant epoxy resin which contains finely divided ceramic particles dispersed in the resin, it should be understood that the ceramic particles are not required in the present anti-fouling coating. It should also be understood that the capsaicin may be provided as a particulate or powder made from finely divided particles of the dried chile pepper rather than a liquid oleoresin capsaicin solution.

The capsaicin additive in accordance with another embodiment of the present invention may be produced in crystalized form.

EXAMPLE 5

A preferred anti-fouling coating utilizing the crystalized capsaicin additive is prepared by mixing from 25% to 50% by weight capsaicin, from 10% to 12.5% by weight of silicon dioxide, from 10% to 12.5% by weight of sodium silicate, and from 10% to 50% by weight of solvent (MEK). The liquid mixture is then allowed to crystalize and the crystalized mixture is pulverized into small crystals approximately the size of salt crystals.

The capsaicin crystals are then mixed with the epoxy resin and the hardening catalyst in the following relative proportions; 72% to 73% by weight of epoxy resin, 22% by weight of the capsaicin crystals, and 5% to 6% by weight of catalyst. The resulting capsaicin-resin-catalyst mixture can then be applied to the surface to be treated and allowed to cure or may be cured in an oven at 170° F. After curing, the resultant coating contains the concentrated capsaicin crystals throughout its thickness.

This crystalizing process prevents, to a large degree, the "bleedout" of the anti-foulant capsaicin into the coating mixture and permits greater loading of the coating with the capsaicin than the process using a liquid oleoresin capsaicin mixture. Mixing the crystalized capsaicin with various coating materials, such as marine paints, or epoxy or polyurethane compounds, reduces the adverse effects on the curing time and physical properties of the coating material which might otherwise occur when using a liquid oleoresin capsaicin.

Since the sodium silicate constituent will dissipate or dissolve when exposed to moisture and/or heated moisture as the coating wears away, the effective life of the anti-fouling properties of the coating is increased. When the above described crystalized capsaicin crystals are combined with an epoxy coating which contains 90% by weight finely divided ceramic particles, a very effective, long lasting, durable, abrasion resistant, anti-fouling coating is provided.

The improved compatibility of the above described particulate or powdered capsaicin, oleoresin capsaicin liquid solution, or capsaicin crystals, allows it to be added to other materials in molding processes for forming various molded products. For example, the material may be added to polyvinyl chloride to form water pipes or added to fiberglass resin to form boat hulls. The products thus formed will have the highly concentrated capsaicin as an integral constituent throughout the thickness of the molded surfaces to provide anti-fouling properties to repel marine life which would otherwise penetrate the surface.

While this invention has been described fully and completely with special emphasis upon a preferred embodiment, it should be understood that within the scope of the appended claims the invention may be practiced otherwise than as specifically described herein.

I claim:

1. An anti-fouling liquid additive having capsaicin as an active ingredient to repel marine organisms comprising a mixture of;
   from about 20% to about 90% by weight capsaicin having a pungency in the range of from about 100,000 to about 1,500,000 Scoville Units, and
   from about 10% to about 80% by weight of a selected solvent.

2. The anti-fouling liquid additive according to claim 1 wherein said mixture comprises;
   from about 10% to about 50% by weight of silicon dioxide,
   from about 20% to about 75% by weight of said capsaicin, and
   from about 15% to about 50% by weight of said selected solvent.

3. The anti-fouling liquid additive according to claim 1 wherein
   said solvent is selected from the group consisting of benzyl alcohol, methyl-ethyl-ketone, and isopropyl alcohol.

4. The anti-fouling liquid additive according to claim 1 wherein
   the pungency of said capsaicin is in the range of from about 100,000 to about 1,500,000 Scoville Units.

5. The anti-fouling liquid additive according to claim 1 wherein
   said capsaicin is derived from finely divided chile pepper plant tissue selected from the group consisting of Habenaro and Bahamian chile peppers having a pungency in the range of from about 100,000 to about 300,000 Scoville Units in a natural state.

6. The anti-fouling liquid additive according to claim 1 wherein
   said capsaicin is derived from oleoresin capsaicin extracted from chile pepper plant tissue selected from the group consisting of Habenaro and Bahamian chile peppers having a pungency in the range of from about 100,000 to about 300,000 Scoville Units in a natural state.

7. The anti-fouling liquid additive according to claim 1 wherein
   said capsaicin is derived from a synthetic capsainoid compound selected from the group consisting of capsaicin and dihydrocapsaicin.

8. An anti-fouling additive in particulate form having capsaicin as an active ingredient to repel marine organisms comprising a mixture of;
   from about 25% to about 50% by weight capsaicin having a pungency in the range of from about 100,000 to about 1,500,000 Scoville Units,
   from about 10% to about 50% by weight of a selected solvent,
   from about 10% to about 12.5% by weight of silicon dioxide, and
   from about 10% to about 12.5% by weight of sodium silicate,
   prepared by the process of mixing said recited ingredients to form a mixture, allowing said mixture to crystallize, and then pulverizing said crystallized mixture.

9. An improved anti-fouling marine coating composition containing capsaicin as an active ingredient in a coating material, wherein the improvement comprises a mixture of;
   from about 25% to about 90% by weight of the coating material, and
   from about 10% to about 75% by weight of capsaicin having a pungency in the range of from about 100,000 to about 1,500,000 Scoville Units.

10. The improved anti-fouling marine coating composition according to claim 9 wherein
    said capsaicin is derived from dried finely divided chile pepper plant tissue selected from the group consisting of Habenaro and Bahamian chile peppers having a pungency in the range of from about 100,000 to about 300,000 Scoville Units in a natural state.

11. The improved anti-fouling marine coating composition according to claim 9 wherein
    said capsaicin is derived from oleoresin capsaicin extracted from chile pepper plant tissue selected from the group consisting of Habenaro and Bahamian chile peppers having a pungency in the range of from about 100,000 to about 300,000 Scoville Units in a natural state.

12. The improved anti-fouling marine coating composition according to claim 9 wherein
    said capsaicin is derived from a synthetic capsainoid compound selected from the group consisting of capsaicin and dihydrocapsaicin.

13. The improved anti-fouling marine coating composition according to claim 9 wherein
    said capsaicin is a liquid solution comprising;
    from about 20% to about 75% by weight capsaicin,
    from about 10% to about 50% by weight of silicon dioxide, and
    from about 15% to about 50% by weight of a selected solvent.

14. The improved anti-fouling marine coating composition according to claim 9 wherein
    said capsaicin is in a crystal form with each crystal comprising;
    from about 25% to about 50% by weight capsaicin,
    from about 10% to about 50% by weight of a selected solvent,
    from about 10% to about 12.5% by weight of silicon dioxide, and
    from about 10% to about 12.5% by weight of sodium silicate.

15. The improved anti-fouling marine coating composition according to claim 9 wherein
    the coating material comprises from about 60% to about 80% resin selected from the group consisting of epoxy resins and polyglycol resins, and from about 4% to about 8% of a hardening catalyst, and
    said capaiscin is in a proportion of from about 20% to about 60% by weight of the coating material.

16. The improved anti-fouling marine coating composition according to claim 9 wherein
    said mixture includes a binding agent selected from the group consisting of polyvinyl chloride, chlorinated rubber, acrylic resins, vinyl chloride-vinyl acetate copolymers, butadiene-styrene-acrylonitrile rubbers, drying oils, and epoxies.

17. The improved anti-fouling marine coating composition according to claim 9 wherein
    the coating material comprises a resin selected from the group consisting of epoxy resins and polyglycol resins, and
    said mixture includes silicon dioxide.

18. The improved anti-fouling marine coating composition according to claim 9 wherein
    said mixture includes a coloring agent selected from the group consisting of inorganic pigments, organic pigments, and dyes.

19. The improved anti-fouling marine coating composition according to claim 9 wherein
    said mixture includes a controlled release agent to provide controlled release of said capsaicin.

20. The improved anti-fouling marine coating composition according to claim 9 wherein
    said mixture includes fine particles of abrasion resistant material.

21. The improved anti-fouling marine coating composition according to claim 9 wherein
    said mixture includes additives selected from the group consisting of plasticizers and rheology modifiers.

22. The improved anti-fouling marine coating composition according to claim 9 wherein
    said mixture includes pesticides.

23. The improved anti-fouling marine coating composition according to claim 9 wherein said mixture includes additives selected from the group consisting of tannic acid, oil of Cassia, and eucalyptus oil.

24. A method for treating surfaces to be exposed to water to discourage the attachment of marine organisms to the surface comprising the steps of:
mixing from about 25% to about 90% by weight of a selected base material with from about 10% to about 75% by weight of a capsaicin constituent having a pungency in the range of from about 100,000 to about 1,500,000 Scoville Units to form a mixture, and
applying said mixture to the surface to be exposed to water.

25. The method according to claim 24 wherein said capsaicin constituent is derived from dried finely divided chile pepper plant tissue selected from the group consisting of Habenaro and Bahamian chile peppers having a pungency in the range of from about 100,000 to about 300,000 Scoville Units in a natural state.

26. The method according to claim 24 wherein said capsaicin constituent is derived from oleoresin capsaicin extracted from chile pepper plant tissue selected from the group consisting of Habenaro and Bahamian chile peppers having a pungency in the range of from about 100,000 to about 300,000 Scoville Units in a natural state.

27. The method according to claim 24 wherein said capsaicin constituent is derived from a synthetic capsainoid compound selected from the group consisting of capsaicin (C) and dihydrocapsaicin (DHC).

28. The method according to claim 24 wherein said capsaicin constituent is a liquid solution comprising from about 20% to about 75% by weight capsaicin, from about 10% to about 50% by weight of silicon dioxide, and from about 15% to about 50% by weight of a selected solvent.

29. The method according to claim 24 wherein said capsaicin constituent is in a crystal form with each crystal comprising; from about 25% to about 50% by weight capsaicin having a pungency in the range of from about 100,000 to about 1,500,000 Scoville Units, from about 10% to about 50% by weight of a selected solvent, from about 10% to about 12.5% by weight of silicon dioxide, and from about 10% to about 12.5% by weight of sodium silicate.

30. The method according to claim 24 wherein said base material comprises from about 60% to about 80% resin selected from the group consisting of epoxy resins, and polyglycol resins, and from about 4% to about 8% of a hardening catalyst, and
said capaiscin constituent is mixed with said base material in a proportion of from about 20% to about 60% by weight of said capaiscin constituent to said base material.

31. The method according to claim 24 wherein said base material comprises a binding agent selected from the group of materials consisting of polyvinyl chloride, chlorinated rubber, acrylic resins, vinyl chloride-vinyl acetate copolymers, butadiene-styrene-acrylonitrile rubbers, drying oils, and epoxies.

32. The method according to claim 24 wherein said base material comprises a resin selected from the group consisting of epoxy resins and polyglycol resins, and said mixture includes
silicon dioxide.

33. The method according to claim 24 wherein said step of mixing includes adding fine particles of abrasion resistant material to said base material.

34. The method according to claim 24 wherein said base material is a molding material used in a molding process to form products, and
said step of applying said mixture to the surface to be exposed to water comprises mixing said capsaicin constituent with said molding material, and thereafter
molding products therefrom having least one surface which contains from about said capsaicin constituent.

35. An article of manufacture having an anti-fouling surface comprising
at least one surface to be exposed to water,
said at least one surface formed of materials containing capsaicin as an active ingredient in an effective amount to discourage the penetration and attachment of marine organisms thereto.

36. An article of manufacture according to claim 35 in which
said at least one surface is formed of materials containing from about 10% to about 75% of capsaicin.

* * * * *